United States Patent
Xie

(10) Patent No.: US 11,995,858 B2
(45) Date of Patent: May 28, 2024

(54) METHOD, APPARATUS AND ELECTRONIC DEVICE FOR STEREO MATCHING

(71) Applicant: AUTEL ROBOTICS CO., LTD., Guangdong (CN)

(72) Inventor: Qingqing Xie, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 406 days.

(21) Appl. No.: 17/350,714

(22) Filed: Jun. 17, 2021

(65) Prior Publication Data
US 2021/0319580 A1 Oct. 14, 2021

Related U.S. Application Data

(63) Continuation of application No. PCT/CN2019/126040, filed on Dec. 17, 2019.

(30) Foreign Application Priority Data

Dec. 17, 2018 (CN) .......................... 201811544155.6

(51) Int. Cl.
*G06T 7/593* (2017.01)
*G06T 7/11* (2017.01)
*G06T 7/90* (2017.01)

(52) U.S. Cl.
CPC .............. *G06T 7/593* (2017.01); *G06T 7/11* (2017.01); *G06T 7/90* (2017.01); *G06T 2207/10012* (2013.01); *G06T 2207/20028* (2013.01); *G06T 2207/20156* (2013.01)

(58) Field of Classification Search
CPC ... G06T 7/593; G06T 7/11; G06T 7/90; G06T 2207/10012; G06T 2207/20028; G06T 2207/20156
See application file for complete search history.

(56) References Cited

U.S. PATENT DOCUMENTS

2018/0189979 A1* 7/2018 Lin ...................... H04N 13/239
2018/0211400 A1* 7/2018 Park ..................... G06V 30/413

FOREIGN PATENT DOCUMENTS

| CN | 103489183 A | 1/2014 |
| CN | 105513064 A | 4/2016 |
| CN | 109859253 A | 6/2019 |

OTHER PUBLICATIONS

X. Sun, X. Mei, S. Jiao, M. Zhou and H. Wang, "Stereo Matching with Reliable Disparity Propagation," 2011 International Conference on 3D Imaging, Modeling, Processing, Visualization and Transmission, Hangzhou, China, 2011, pp. 132-139, doi: 10.1109/3DIMPVT.2011.24. (Year: 2011).*

(Continued)

*Primary Examiner* — Bobbak Safaipour
*Assistant Examiner* — Jongbong Nah
(74) *Attorney, Agent, or Firm* — Frank Gao, Esq.

(57) ABSTRACT

Embodiments of the present invention relate to the field of machine vision technologies, and specifically disclose a method, apparatus and electronic device for stereo matching. By means of the foregoing technical solutions, the embodiments of the present invention can achieve an improvement in both a speed and an accuracy of stereo matching.

16 Claims, 3 Drawing Sheets

---

Calculate initial disparity values of pixel points in a left view and a right view by using a local stereo matching algorithm, to obtain an initial left disparity map of the left view and an initial right disparity map of the right view — 110

Select, from the initial left disparity map or the initial right disparity map, a pixel point that meets a preset condition as a seed point, and use the initial disparity value of the pixel point as a disparity value of the seed point — 120

For each non-seed point, construct a confidence propagation region corresponding to the non-seed point in a horizontal direction based on a color difference and a spatial pixel-to-pixel distance — 130

Determine a disparity value of the non-seed point based on a disparity value of a left seed point or a right seed point in the confidence propagation region that is immediately adjacent to the non-seed point — 140

Form a dense disparity map based on disparity values of all seed points and disparity values of all non-seed points — 150

(56) References Cited

OTHER PUBLICATIONS

Yang, Yingyun, Huabing Wang, and Bo Liu. "A new stereo matching algorithm based on adaptive window." 2012 International Conference on Systems and Informatics (ICSAI2012). IEEE, 2012. (Year: 2012).*

Hwang, Jae-Jeong, and Hong Ren Wu. "Stereo image quality assessment using visual attention and distortion predictors." KSII Transactions on Internet and Information Systems (TIIS) 5.9 (2011): 1613-1631. (Year: 2011).*

Han-Ping Hu, et al; "Fast Stereo Matching Bassed on Seed Pixel Propagation", Optics and Precision Engineering, vol. 23, No. 3; Mar. 2015, 8 pages.

Su Xiu, et al; "Adaptive Window Local Matching Algorithm Based on HSV Color Space", Laser and Optoelectronics Progress, vol. 55, Issue 3, 2018, 8 pages.

The International Search Report dated Mar. 25, 2020; PCT/CN2019/126040.

The First Chinese Office Action dated Jul. 21, 2020; Appln. No. 201811544155.6.

The Second Chinese Office Action dated Feb. 10, 2021; Appln. No. 201811544155.6.

\* cited by examiner

```
┌──────────────────────────────────────────────────────────────────────┐
│ Calculate initial disparity values of pixel points in a left view and a right view by │ ─── 110
│ using a local stereo matching algorithm, to obtain an initial left disparity map of   │
│         the left view and an initial right disparity map of the right view            │
└──────────────────────────────────────────────────────────────────────┘
                                       ▼
┌──────────────────────────────────────────────────────────────────────┐
│ Select, from the initial left disparity map or the initial right disparity map, a pixel │
│   point that meets a preset condition as a seed point, and use the initial disparity   │ ─── 120
│            value of the pixel point as a disparity value of the seed point             │
└──────────────────────────────────────────────────────────────────────┘
                                       ▼
┌──────────────────────────────────────────────────────────────────────┐
│       For each non-seed point, construct a confidence propagation region             │
│    corresponding to the non-seed point in a horizontal direction based on a color    │ ─── 130
│                 difference and a spatial pixel-to-pixel distance                     │
└──────────────────────────────────────────────────────────────────────┘
                                       ▼
┌──────────────────────────────────────────────────────────────────────┐
│ Determine a disparity value of the non-seed point based on a disparity value of a   │
│  left seed point or a right seed point in the confidence propagation region that is  │ ─── 140
│                    immediately adjacent to the non-seed point                        │
└──────────────────────────────────────────────────────────────────────┘
                                       ▼                                                 ─── 150
┌──────────────────────────────────────────────────────────────────────┐
│     Form a dense disparity map based on disparity values of all seed points and      │
│                       disparity values of all non-seed points                        │
└──────────────────────────────────────────────────────────────────────┘
```

FIG. 1

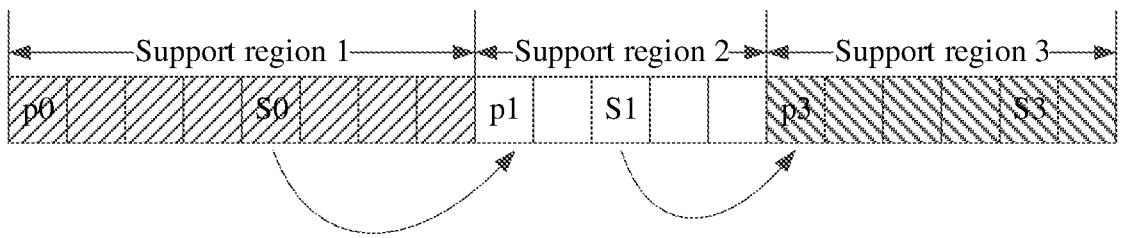

FIG. 2

METHOD, APPARATUS AND ELECTRONIC DEVICE FOR STEREO MATCHING

CROSS REFERENCE

This application is a continuation of International Application No. PCT/CN2019/126040, filed on Dec. 17, 2019, which claims priority to Chinese Patent Application No. 2018115441556 filed on Dec. 17, 2018, which is incorporated herein by reference in its entirety.

BACKGROUND

Technical Field

Embodiments of the present invention relate to the field of computer vision technologies, and in particular, to a method, apparatus and electronic device for stereo matching.

Related Art

Stereo matching is a technology in which a disparity map is calculated from binocular views of the same scene, which is used to recover depth information from a plane image. As a key step in technologies such as three-dimensional reconstruction, three-dimensional navigation, non-contact ranging, the stereo matching technology has been widely used in fields such as unmanned driving (ranging, navigation), 3D display, security monitoring, remote sensing image analysis, robot intelligent control and the like.

Currently, mainstream stereo matching algorithms may be divided into two categories: a local stereo matching algorithm and a global stereo matching algorithm. The local stereo matching algorithm takes less time but the obtained stereo matching effect is more ambiguous, while the global stereo matching algorithm can be used to obtain a better stereo matching effect but cannot achieve a real-time effect due to a slow convergence optimization process. Accordingly, in order to balance the speed and accuracy, some scholars have proposed a method for stereo matching that uses a disparity value of seed pixel points in a segmentation region to perform disparity propagation. However, the early segmentation work of the method is time-consuming, and it is still difficult to balance the speed and accuracy.

Therefore, the existing method for stereo matching needs to be improved and developed.

SUMMARY

In view of this, embodiments of the present invention provide a method, apparatus and electronic device for stereo matching, which can achieve an improvement in both a speed and an accuracy of stereo matching.

To resolve the foregoing technical problem, the embodiments of the present invention provide the following technical solutions:

According to a first aspect, an embodiment of the present invention provides a stereo matching method, including:

calculating initial disparity values of pixel points in a left view and a right view by using a local stereo matching algorithm, to obtain an initial left disparity map of the left view and an initial right disparity map of the right view;

selecting, from the initial left disparity map or the initial right disparity map, a pixel point that meets a preset condition as a seed point, and using the initial disparity value of the pixel point as a disparity value of the seed point, where the preset condition includes: a left-right consistency check is passed;

for each non-seed point, constructing a confidence propagation region corresponding to the non-seed point in a horizontal direction based on a color difference and a spatial pixel-to-pixel distance;

determining a disparity value of the non-seed point based on a disparity value of a left seed point or a right seed point in the confidence propagation region that is immediately adjacent to the non-seed point; and forming a dense disparity map based on disparity values of all seed points and disparity values of all non-seed points.

Optionally, the selecting, from the initial left disparity map or the initial right disparity map, a pixel point that meets a preset condition as a seed point includes:

scanning line-by-line the initial left disparity map or the initial right disparity map to select the pixel point that meets the preset condition as the seed point, where for each scan line, rightward line segmentation is performed starting from a leftmost pixel point of the scan line based on the color difference and the spatial pixel-to-pixel distance, to obtain a plurality of support regions, where each of the support regions is searched starting from the leftmost pixel point for the pixel point that meets the preset condition as the seed point, and when the seed point is found in the support region, a next support region is searched for a next seed point.

Optionally, the preset condition includes:

during local stereo matching, a difference between a second smallest cost and a smallest cost corresponding to the pixel point is greater than or equal to a first preset threshold.

Optionally, the constructing a confidence propagation region corresponding to the non-seed point in a horizontal direction based on a color difference and a spatial pixel-to-pixel distance includes:

with the non-seed point as a center, detecting a left segmentation point and a right segmentation point of the non-seed point respectively in a horizontally leftward direction and a horizontally rightward direction, and using a region between the left segmentation point and the right segmentation point as the confidence propagation region corresponding to the non-seed point, where the left segmentation point and the right segmentation point meet the following condition:

a color difference with the non-seed point is greater than a second preset threshold; or a spatial pixel-to-pixel distance with the non-seed point is greater than a third preset threshold.

Optionally, the determining a disparity value of the non-seed point based on a disparity value of a left seed point or a right seed point in the confidence propagation region that is immediately adjacent to the non-seed point includes:

if only the left seed point that is immediately adjacent to the non-seed point exists in the confidence propagation region, using the disparity value of the left seed point as the disparity value of the non-seed point;

if only the right seed point that is immediately adjacent to the non-seed point exists in the confidence propagation region, using the disparity value of the right seed point as the disparity value of the non-seed point; or if both the left seed point and the right seed point that are immediately adjacent to the non-seed point exist in the confidence propagation region, determining the disparity value of the non-seed point according to a characteristic of a region in which the non-seed point is located and based on the disparity value of the left seed point and the disparity value of the right seed point.

Optionally, the determining the disparity value of the non-seed point according to a characteristic of a region in which the non-seed point is located and based on the disparity value of the left seed point and the disparity value of the right seed point includes:

if the non-seed point is in a blocked region or a depth-discontinuous region, using a smaller one of the disparity value of the left seed point and the disparity value of the right seed point as the disparity value of the non-seed point; or otherwise, using a linearly interpolated value between the disparity value of the left seed point and the disparity value of the right seed point as the disparity value of the non-seed point.

Optionally, after the step of forming the dense disparity map based on the disparity values of all seed points and the disparity values of all non-seed points, the method further includes:

correcting a fringe effect in the dense disparity map based on voting in a vertical direction.

Optionally, after the step of correcting the fringe effect in the dense disparity map based on the voting in the vertical direction, the method further includes:

updating the disparity value of each pixel point by bilateral filtering in four adjacent regions of the pixel point.

In a second aspect, an embodiment of the present invention provides an apparatus for stereo matching, including a matching unit, a seed point unit, a disparity propagation unit and a disparity map generation unit.

The matching unit is configured to calculate initial disparity values of pixel points in a left view and a right view by using a local stereo matching algorithm, to obtain an initial left disparity map of the left view and an initial right disparity map of the right view.

The seed point unit includes a seed point selection module and a seed point disparity determination module.

The seed point selection module is configured to select, from the initial left disparity map or the initial right disparity map, a pixel point that meets a preset condition as a seed point, where the preset condition includes: a left-right consistency check is passed.

The seed point disparity determination module is configured to use the initial disparity value of the pixel point as a disparity value of the seed point.

The disparity propagation unit includes a segmentation module and a disparity propagation module.

For each non-seed point, the segmentation module is configured to construct a confidence propagation region corresponding to the non-seed point in a horizontal direction based on a color difference and a spatial pixel-to-pixel distance.

The disparity propagation module is configured to determine a disparity value of the non-seed point based on a disparity value of a left seed point or a right seed point in the confidence propagation region that is immediately adjacent to the non-seed point.

The disparity map generation unit is configured to form a dense disparity map based on disparity values of all seed points and disparity values of all non-seed points.

Optionally, the seed point selection module is specifically configured to:

scan line-by-line the initial left disparity map or the initial right disparity map to select the pixel point that meets the preset condition as the seed point, where for each scan line, rightward line segmentation is performed starting from a leftmost pixel point of the scan line based on the color difference and the spatial pixel-to-pixel distance, to obtain a plurality of support regions, where each of the support regions is searched starting from the leftmost pixel point for the pixel point that meets the preset condition as the seed point, and when the seed point is found in the support region, a next support region is searched for a next seed point.

Optionally, the preset condition includes:

during local stereo matching, a difference between a second smallest cost and a smallest cost corresponding to the pixel point is greater than or equal to a first preset threshold.

Optionally, the segmentation module is specifically configured to:

with the non-seed point as a center, detect a left segmentation point and a right segmentation point of the non-seed point respectively in a horizontally leftward direction and a horizontally rightward direction, and use a region between the left segmentation point and the right segmentation point as the confidence propagation region corresponding to the non-seed point, where the left segmentation point and the right segmentation point meet the following condition:

a color difference with the non-seed point is greater than a second preset threshold; or a spatial pixel-to-pixel distance with the non-seed point is greater than a third preset threshold.

Optionally, the disparity propagation module is specifically configured to:

if only the left seed point that is immediately adjacent to the non-seed point exists in the confidence propagation region, use the disparity value of the left seed point as the disparity value of the non-seed point;

if only the right seed point that is immediately adjacent to the non-seed point exists in the confidence propagation region, use the disparity value of the right seed point as the disparity value of the non-seed point; or if both the left seed point and the right seed point that are immediately adjacent to the non-seed point exist in the confidence propagation region, determine the disparity value of the non-seed point according to a characteristic of a region in which the non-seed point is located and based on the disparity value of the left seed point and the disparity value of the right seed point.

Optionally, if both the left seed point and the right seed point that are immediately adjacent to the non-seed point exist in the confidence propagation region, the disparity propagation module is specifically configured to:

if the non-seed point is in a blocked region or a depth-discontinuous region, use a smaller one of the disparity value of the left seed point and the disparity value of the right seed point as the disparity value of the non-seed point; or otherwise, use a linearly interpolated value between the disparity value of the left seed point and the disparity value of the right seed point as the disparity value of the non-seed point.

Optionally, the apparatus further includes a correction unit, where configured to correct a fringe effect in the dense disparity map based on voting in a vertical direction.

Optionally, the correction unit is further configured to:

update the disparity value of each pixel point by bilateral filtering in four adjacent regions of the pixel point.

According to a third aspect, an embodiment of the present invention provides an electronic device, including:

at least one processor; and a memory communicatively connected to the at least one processor, where the memory storing instructions executable by the at least one processor, the instructions being executed by the at least one processor, to enable the at least one processor to perform the stereo matching method described above.

According to a fourth aspect, an embodiment of the present invention provides non-transitory computer-readable storage medium, the non-transitory computer-readable storage medium storing computer executable instructions, and the computer executable instructions being configured to enable the electronic device to perform the stereo matching method described above.

In a fifth aspect, an embodiment of the present invention further provides a computer program product that includes a computer program stored in a non-transitory computer-readable storage medium, the computer program including program instructions that, when executed by an electronic device, cause the electronic device to perform the method for stereo matching described above.

The beneficial effects of the embodiments of the present invention are as follows. Different from the situation in the prior art, according to the method, apparatus and electronic device for stereo matching provided in the embodiment of the present invention, initial disparity values of pixel points in binocular views are first calculated by using a local stereo matching algorithm, to obtain an initial left disparity map and an initial right disparity map. Then a pixel point that meets a preset condition (which includes: a left-right consistency check is passed) is selected as a seed point from the initial left disparity map or the initial right disparity map, and an initial disparity value of the pixel point is used as a disparity value of the seed point. For each non-seed point, a confidence propagation region corresponding to the non-seed point is constructed in a horizontal direction based on a color difference and a spatial pixel-to-pixel distance, a disparity value of the non-seed point is determined based on a disparity value of a left seed point or a right seed point in the confidence propagation region that is immediately adjacent to the non-seed point, and finally a dense disparity map with a higher accuracy can be quickly formed based on disparity values of all seed points and disparity values of all non-seed points, so as to achieve an improvement in both a speed and an accuracy of stereo matching.

BRIEF DESCRIPTION OF THE DRAWINGS

To describe the technical solutions in the embodiments of the present invention more clearly, the following briefly describes the accompanying drawings required for describing the embodiments of the present invention. Obviously, the accompanying drawings in the following descriptions are merely some embodiments of the invention, and a person of ordinary skill in the art may further obtain other accompanying drawings according to the accompanying drawings without creative efforts.

FIG. 1 is a schematic flowchart of a stereo matching method according to an embodiment of the present invention.

FIG. 2 is a schematic diagram of an example of selecting a seed point according to an embodiment of the present invention.

DETAILED DESCRIPTION

Figure 3:
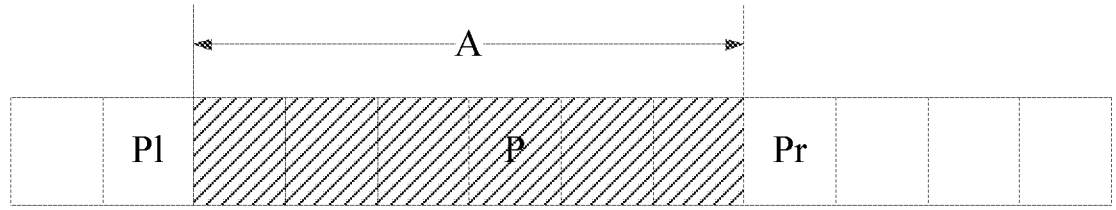
FIG. 3 is a schematic diagram of an example of constructing a confidence propagation region of a non-seed point according to an embodiment of the present invention.

To make the objectives, technical solutions, and advantages of the present disclosure clearer and more comprehensible, the following further describes the present disclosure in detail with reference to the accompanying drawings and embodiments. It should be understood that the embodiments herein are provided for describing the present invention and not intended to limit the present invention.

It should be noted that, if no conflict occurs, features in the embodiments of the present invention may be combined with each other and fall within the protection scope of the present invention. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart. Further, terms such as "first", "second", or the like used in the present invention do not limit data or an execution order, but are only used to distinguish the same objects or similar objects whose functions and purposes are basically the same.

The embodiments of the present invention provide a method, apparatus and electronic device for stereo matching, which can be applied to any application scenario that require stereo matching to obtain a disparity map, for example, three-dimensional reconstruction, binocular vision ranging, unmanned driving, and three-dimensional display, robot intelligent control and the like.

Specifically, the method for stereo matching provided in the embodiment of the present invention may be performed by any electronic device and is a method for forming a dense disparity map based on seed point propagation, specifically including: first calculating initial disparity values of pixel points in a left view and a right view by using a local stereo matching algorithm, to obtain an initial left disparity map of the left view and an initial right disparity map of the right view; then selecting, from the initial left disparity map or the initial right disparity map, a pixel point that meets a preset condition as a seed point, and using the initial disparity value of the pixel point as a disparity value of the seed point, where the preset condition includes: a left-right consistency check is passed; for each non-seed point, constructing a confidence propagation region corresponding to the non-seed point in a horizontal direction based on a color difference and a spatial pixel-to-pixel distance; determining a disparity value of the non-seed point based on a disparity value of a left seed point or a right seed point in the confidence propagation region that is immediately adjacent to the non-seed point; and finally forming a dense disparity map based on disparity values of all seed points and disparity values of all non-seed points. In the method for stereo matching provided in the embodiment of the present invention, on the one hand, since only local stereo matching and disparity propagation are required, the dense disparity map can be quickly formed. On the other hand, since a pixel point with higher reliability during the local stereo matching is selected as the seed point, and disparity propagation is performed within the confidence propagation region formed based on the color difference and the spatial pixel-to-pixel distance, the accuracy of the disparity values of the pixel points in the formed dense disparity map can be improved, thereby achieving an improvement in both a speed and an accuracy of stereo matching.

The apparatus for stereo matching provided in the embodiment of the present invention may be a virtual apparatus composed of a software program that can implement the method for stereo matching provided in the embodiment of the present invention, which is based on the same inventive concept as the method for stereo matching provided in the embodiment of the present invention and has the same technical features and beneficial effects.

The electronic device provided in the embodiment of the present invention may be any hardware device that has a certain logical computing capability and that can provide one or more functions that can meet user requirements. For example, the electronic device may include but is not limited to: an unmanned aerial vehicle (UAV), a robot, an automotive MCU, a smart phone, a tablet computer, a server and the like. The electronic device can perform the method for stereo matching provided in the embodiment of the present invention or run the apparatus for stereo matching provided in the embodiment of the present invention, which is based on the same inventive concept as the method for stereo matching provided in the embodiment of the present invention and has the same technical features and beneficial effects.

The method, apparatus and electronic device for stereo matching provided in the present invention are to be further described below with reference to the various embodiments and accompanying drawings.

Embodiment I

FIG. 1 is a schematic flowchart of a method for stereo matching according to an embodiment of the present invention. The method may be performed by an electronic device such as a UAV, a robot, an automotive MCU and the like.

Specifically, referring to FIG. 1, the method for stereo matching may include but is not limited to the following steps.

Step 110: Calculate initial disparity values of pixel points in a left view and a right view by using a local stereo matching algorithm, to obtain an initial left disparity map of the left view and an initial right disparity map of the right view.

In this embodiment, the "left view" and the "right view" refer to binocular views corresponding to the same shooting scene, and the binocular view may be pre-stored in the electronic device, or may be received from a certain data source, or may be obtained through real-time shooting by using a binocular camera or a monocular camera.

The "initial left disparity map" includes the initial disparity values of the pixel points in the left view, where in the initial left disparity map, the initial disparity value of a pixel point specifically refers to a distance d1 between a position in which the pixel point is located and a position in which a corresponding point/matching point of the pixel point in the right view is located. The "initial right disparity map" includes the initial disparity values of the pixel points in the right view, where in the initial right disparity map, the initial disparity value of a pixel point specifically refers to a distance d2 between a position in which the pixel point is located and a position in which a corresponding point/matching point of the pixel point in the left view is located.

In this embodiment, the initial disparity values of the pixel points in the given left view and right view may be calculated by adopting any local stereo matching algorithm such as the sum of absolute differences (SAD), an adaptive window algorithm, an adaptive weight algorithm and the like, to obtain the initial left disparity map of the left view and the initial right disparity map of the right view.

In some embodiments, in the process of local stereo matching, for each pixel p in the left view, a sum of a color difference between the pixel p and its corresponding point q in the right view and a difference in structure coding may constitute a cost equation of the pixel p, so that an initial disparity value of the pixel p is determined by optimizing the cost equation. Similarly, for each pixel q in the right view, a sum of a color difference between the pixel q and its corresponding point p in the left view and a difference of structure coding may also constitute a cost equation of the pixel q, so that an initial disparity value of the pixel q is determined by optimizing the cost equation.

In the embodiment of the present invention, the initial disparity value of each of the pixel points in the left view and the right view is calculated by using a simple local stereo matching algorithm, which can reduce a calculation amount of the stereo matching process and increase the speed of the stereo matching.

Step 120: Select, from the initial left disparity map or the initial right disparity map, a pixel point that meets a preset condition as a seed point, and use the initial disparity value of the pixel point as a disparity value of the seed point.

In this embodiment, the "preset condition" includes: a left-right consistency check is passed, that is, the initial disparity value of the pixel point p in the initial left disparity map is equal to the initial disparity value of the corresponding point q of the pixel point p in the initial right disparity map; alternatively, the initial disparity value of the pixel point q in the initial right disparity map is equal to the initial disparity value of the corresponding point p of the pixel point q in the initial left disparity map. The "seed point" is a starting point of the disparity propagation process.

In practical application, disparity propagation may be performed based on the initial left disparity map to form a final dense disparity map; or disparity propagation may be performed based on the initial right disparity map to form a final dense disparity map.

Therefore, in this embodiment, a pixel point that meets the preset condition may be selected as the seed point from the initial left disparity map, a pixel point that does not meet the preset condition is a non-seed point, and the disparity values of all seed points and the disparity values of all non-seed points are finally combined to form the dense disparity map. Alternatively, a pixel point that meets the preset condition may be selected as the seed point from the initial right disparity map, a pixel point that does not meet the preset condition is a non-seed point, and the disparity values of all seed points and the disparity values of all non-seed points are finally combined to form the dense disparity map.

The pixel point that meets the preset condition is selected as the seed point from the initial left disparity map by way of example for detailed description below.

Specifically, a specific implementation in which the pixel point that meets the preset condition is selected as the seed point from the initial left disparity map may be: determining each of the pixel points in the initial left disparity map one by one, and if a pixel point meets the preset condition, marking the pixel point as a seed point.

Alternatively, in some other embodiments, a specific implementation in which the pixel point that meets the preset condition is selected as the seed point from the initial left disparity map may be:

scanning line-by-line the initial left disparity map to select the pixel point that meets the preset condition as the seed point. Specifically, during the line-by-line scanning, for each scan line, rightward line segmentation is performed starting from a leftmost pixel point of the scan line based on the color difference and the spatial pixel-to-pixel distance, to obtain a plurality of support regions, where each of the support regions is searched starting from the leftmost pixel point for the pixel point that meets the preset condition as the seed point, and when the seed point is found in the support region, a next support region is searched for a next seed point.

The "color difference" is used to describe the color difference between two pixel points, which may specifically be: an absolute value of differences between the two pixel points on a color channel with the largest difference in color channels. For example, in an RGB space, if an absolute value of differences between a pixel point p0 and a pixel point p1 on a channel R is I1, an absolute value of differences on a channel G is I2, an absolute value of differences on a channel B is I3 and I1>I2>I3, then the color difference between the pixel point p0 and the pixel point p1 is I1. In this embodiment, the color difference between the two pixel points is measured with the absolute value of the differences on the color channel with the largest difference, which can erroneous determination caused by simultaneous great changes in the color channels due to changes in conditions such as illumination, thus reflecting a real edge of the scene more accurately.

The "spatial pixel-to-pixel distance" refers to a pixel distance between two pixel points. For example, the spatial pixel-to-pixel distance between the pixel point p0 and the pixel point p1 is x pixel points.

The "performing rightward line segmentation based on the color difference and the spatial pixel-to-pixel distance starting from a leftmost pixel point of the scan line, to obtain a plurality of support regions" may specifically be: as shown in FIG. 2, using the leftmost pixel point p0 in the scan line as the starting point, determining, one by one rightward, whether a color difference between the pixel points and the starting point p0 and the spatial pixel-to-pixel distance are both within a corresponding predetermined range; if so, determining that the pixel point and the starting point p0 are in the same support region; and if not, using the pixel point as a starting point p1 of a next support region, and continuing rightward linear segmentation and so on, so as to obtain a plurality of support regions on the scan line.

Further, since adjacent pixel points with similar colors have similar disparity, it may be considered that disparity changes between pixel points in the same support region are continuous and slow. Therefore, during selection of a seed point, as long as a seed point S0 is found in a certain support region (for example, a support region 1), the next support region (for example, the support region 2) may be searched for a next seed point S1 starting from the starting point p1 of the next support region (for example, a support region 2), and so on. In this way, there is no need to determine all of the pixel points one by one (for example, perform a left-right consistency check), so as to reduce the calculation amount of stereo matching and increase the speed of stereo matching without damaging the accuracy of stereo matching.

Furthermore, since the seed point is a pixel point that has passed the left-right consistency check at least, and the left-right consistency check being passed indicates that the initial disparity value of the pixel point has high confidence, the initial disparity value may be considered as a correct disparity value, so that the initial disparity value of the pixel point may be directly used as the disparity value of the seed point/pixel point.

Certainly, in order to further improve the confidence of the disparity value of the seed point and improve the accuracy of subsequent calculation, some additional restrictions may also be added to the "preset condition". For example, in some embodiments, the "preset condition" may further include: during local stereo matching, a difference between a second smallest cost and a smallest cost corresponding to the pixel point is greater than or equal to a first preset threshold. The first threshold may be a fixed value, or may be a value greater than 50% of the second smallest cost, as long as the minimum cost corresponding to the pixel point is significantly less than the second smallest cost.

Step 130: For each non-seed point, construct a confidence propagation region corresponding to the non-seed point in a horizontal direction based on a color difference and a spatial pixel-to-pixel distance.

In this embodiment, the "non-seed point" refers to other pixel points in the initial left disparity map (or the initial right disparity map) except for the seed point. The "confidence propagation region" is a linear segmentation region of the non-seed point, which is used for disparity propagation to determine the disparity value of the non-seed point. The disparity value in each confidence propagation region changes slowly.

In this embodiment, linear segmentation may be performed for each non-seed point along the scan line direction to obtain the confidence propagation region corresponding to each non-seed point.

During the linear segmentation, as shown in FIG. 3, a non-seed point P may be used as a center to respectively detect a left segmentation point Pl and a right segmentation point Pr of the non-seed point P in a horizontally leftward direction and a horizontally rightward direction, and a region A (exclusive of the left segmentation point Pl and the right segmentation point Pr) between the left segmentation point Pl and the right segmentation point Pr is used as the confidence propagation region corresponding to the non-seed point. The left segmentation point Pl and the right segmentation point Pr meet one or all of the following conditions:

(1) a color difference with the non-seed point P is greater than a second preset threshold; and (2) a spatial pixel-to-pixel distance with the non-seed point P is greater than a third preset threshold.

The second preset threshold and the third preset threshold may be set according to actual application scenarios, as long as the region A between the left segmentation point Pl and the right segmentation point Pr satisfies the characteristic that the disparity values slowly change.

In this embodiment, the confidence propagation region of each non-seed point is determined based on the color difference and the spatial pixel-to-pixel distance, and disparity propagation is performed within the confidence propagation region, which can avoid the blur caused by crossing the foreground and the background in the disparity propagation process, thus improving the accuracy of stereo matching.

Step 140: Determine a disparity value of the non-seed point based on a disparity value of a left seed point or a right seed point in the confidence propagation region that is immediately adjacent to the non-seed point.

In this embodiment, for each non-seed point, the disparity value of the non-seed point is determined based on the disparity value of the left seed point or the right seed point in the corresponding confidence propagation region that is immediately adjacent to the non-seed point.

During specific implementation, disparity propagation of the seed points may be performed in the direction of the scan line. For each non-seed point, the left seed point Sl and the right seed point Sr that are immediately adjacent to the non-seed point may be first found in the corresponding confidence propagation region of the non-seed point.

If only the left seed point Sl that is immediately adjacent to the non-seed point P exists in the confidence propagation region, the disparity value of the left seed point Sl is used as the disparity value of the non-seed point P according to the characteristic that the pixel points in the same confidence propagation region have a similar disparity value. Similarly, if only the right seed point Sr that is immediately adjacent to the non-seed point P exists in the confidence propagation region, the disparity value of the right seed point Sr is used as the disparity value of the non-seed point P.

If both the left seed point Sl and the right seed point Sr that are immediately adjacent to the non-seed point P exist in the confidence propagation region, in some embodiments, a linearly interpolated value between the disparity value of the left seed point S1 and the disparity value of the right seed point Sr may be directly used as the disparity value of the non-seed point P.

Alternatively, in some other embodiments, if both the left seed point Sl and the right seed point Sr that are immediately adjacent to the non-seed point P exist in the confidence propagation region, the disparity value of the non-seed point P may also be determined based on the disparity value of the left seed point Sl and the disparity value of the right seed point Sr according to the characteristic of the region in which the non-seed point P is located.

For example, if the non-seed point P is in the blocked region (if the absolute value of the difference between the initial disparity value of the non-seed point P and the initial disparity value of the corresponding point Q of the non-seed point P in the initial right disparity map is greater than or equal to a fourth preset threshold (for example, 1 or 2 pixel points), it may be considered that the non-seed point P is in the blocked region), it indicates that the non-seed point P is in a switching region between the foreground and the background, and the characteristic of the switching region is that some parts of the switching region are visible to one view (for example, the left view) but not to an other view (for example, the right view). Therefore, there is no accurate disparity calculation. In this case, it may be considered that the non-seed point P is located far away, and a smaller one of the disparity value of the left seed point Sl and the disparity value of the right seed point Sr is used as the disparity value of the non-seed point P.

For another example, if the non-seed point P is in a depth-discontinuous region (if the absolute value of the difference between the disparity value of the left seed point Sl that is immediately adjacent to the non-seed point P and the disparity value of the right seed point Sr is greater than a fifth preset threshold, it may be considered that the non-seed point P is in the depth-discontinuous region), it indicates that the non-seed point P is on the edge of some rapid changes. In this case, it may also be considered that the non-seed point P is located far away, and the smaller one of the disparity value of the left seed point S1 and the disparity value of the right seed point Sr is used as the disparity value of the non-seed point P.

In addition, if the non-seed point P is located neither in the blocked region nor in the depth-discontinuous region, it may be considered that the non-seed point P is located in a smooth region in which the disparity changes slowly. At this point, the linearly interpolated value between the disparity value of the left seed point and the disparity value of the right seed point is used as the disparity value of the non-seed point.

In this embodiment, the disparity value of the non-seed point P is determined based on the disparity value of the left seed point Sl and the disparity value of the right seed point Sr according to the characteristic of the region in which the non-seed point P is located, so as to further improve the confidence of the disparity values of the non-seed points, thus improving the accuracy of stereo matching.

Step 150: Form a dense disparity map based on disparity values of all seed points and disparity values of all non-seed points.

In this embodiment, all of the pixel points in the initial left disparity map (or, the initial right disparity map) are divided into two categories, that is, seed points and non-seed points. Therefore, the disparity values of all of the seed points and the disparity values of all of the non-seed points are integrated according to corresponding coordinate positions to form a dense disparity map.

It may be learned from the above technical solutions that, the beneficial effects of the embodiments of the present invention lie in that, according to the method for stereo matching provided in the embodiment of the present invention, initial disparity values of pixel points in binocular views are first calculated by using a local stereo matching algorithm, to obtain an initial left disparity map and an initial right disparity map. Then a pixel point that meets a preset condition (which includes: a left-right consistency check is passed) is selected as a seed point from the initial left disparity map or the initial right disparity map, and an initial disparity value of the pixel point is used as a disparity value of the seed point. For each non-seed point, a confidence propagation region corresponding to the non-seed point is constructed in a horizontal direction based on a color difference and a spatial pixel-to-pixel distance, a disparity value of the non-seed point is determined based on a disparity value of a left seed point or a right seed point in the confidence propagation region that is immediately adjacent to the non-seed point, and finally a dense disparity map with a higher accuracy can be quickly formed based on disparity values of all seed points and disparity values of all non-seed points, so as to achieve an improvement in both a speed and an accuracy of stereo matching.

Embodiment II

Further, on the basis of Embodiment I above, Embodiment II of the present invention further provides another method for stereo matching.

Figure 4:
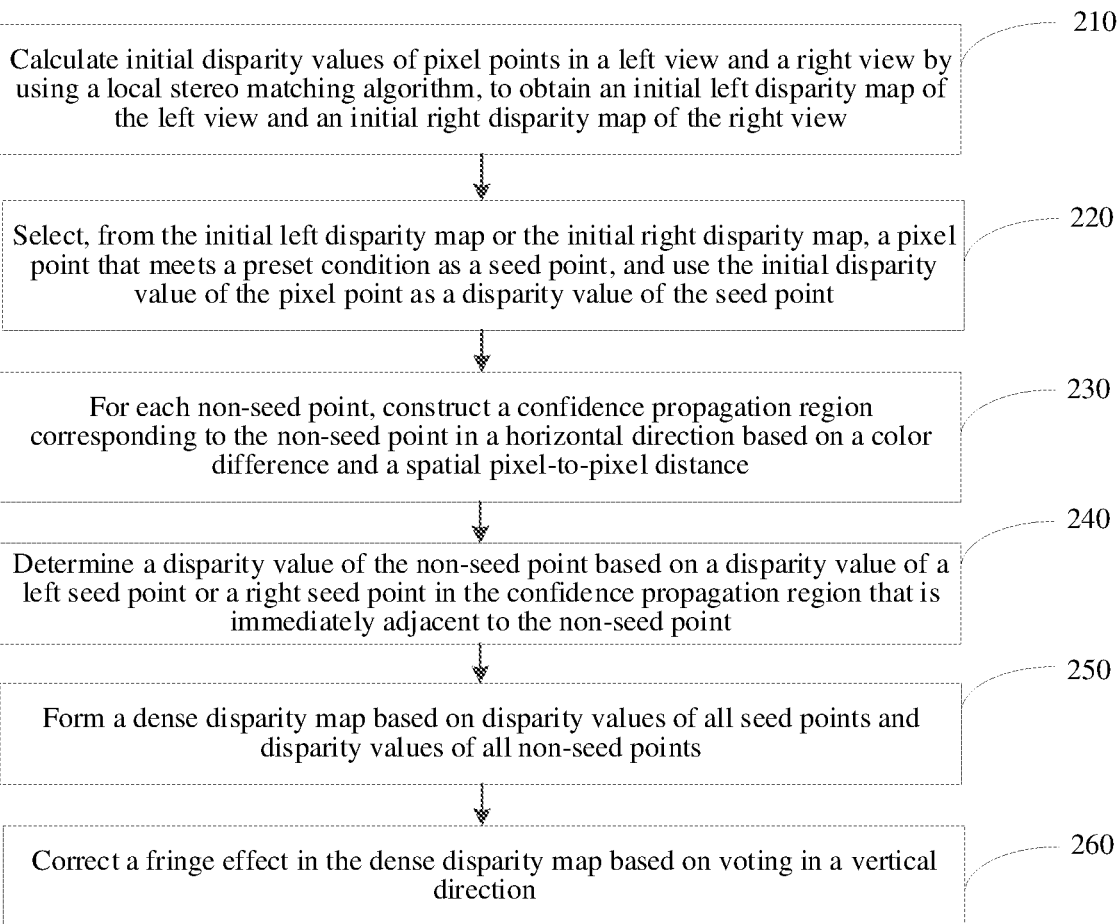
FIG. 4 is a schematic flowchart of another stereo matching method according to an embodiment of the present invention.

Specifically, referring to FIG. 4, the method may include but is not limited to the following steps.

Step 210: Calculate initial disparity values of pixel points in a left view and a right view by using a local stereo matching algorithm, to obtain an initial left disparity map of the left view and an initial right disparity map of the right view.

Step 220: Select, from the initial left disparity map or the initial right disparity map, a pixel point that meets a preset condition as a seed point, and use the initial disparity value of the pixel point as a disparity value of the seed point.

Step 230: For each non-seed point, construct a confidence propagation region corresponding to the non-seed point in a horizontal direction based on a color difference and a spatial pixel-to-pixel distance.

Step 240: Determine a disparity value of the non-seed point based on a disparity value of a left seed point or a right seed point in the confidence propagation region that is immediately adjacent to the non-seed point.

Step 250: Form a dense disparity map based on disparity values of all seed points and disparity values of all non-seed points.

Step 260: Correct a fringe effect in the dense disparity map based on voting in a vertical direction.

Since the confidence propagation region is constructed in the horizontal direction for disparity propagation during the determining the disparity values of the non-seed points in above steps 230 and 240, horizontal stripes may be generated. Therefore, in this embodiment, the fringe effect in the dense disparity map is further corrected based on the voting in the vertical direction.

Specifically, for each pixel point p in the dense disparity map, a histogram with (0, d max) as a horizontal axis range may be first constructed, where d max is a given maximum disparity value. Then, the pixel point p is used as the center, and pixel points within adjacent regions are selected in the vertical direction. If a color difference between a certain pixel point p1 in the adjacent regions and the pixel point p is less than a threshold, then the disparity value corresponding to the pixel point p1 is marked on the horizontal axis of the histogram, and 1 is added to a vertical axis corresponding to the disparity value. Finally, the disparity value (that is, the disparity value with the largest number of votes) corresponding to the maximum value on the vertical axis in the histogram is selected as the disparity value of the pixel point p. Therefore, adverse effects in the horizontal direction can be offset, and real-time performance is better.

Further, in some embodiments, in order to further improve the accuracy of stereo matching, the method may further include: updating the disparity value of each pixel point by bilateral filtering in four adjacent regions of the pixel point. The "four adjacent regions" refer to four pixel points on the top, bottom, left and right that are immediately adjacent to the pixel point. The disparity value of the pixel point is updated by bilateral filtering in four adjacent regions of each of the pixel points, so as to filter out noise generated by the above disparity propagation and/or vertical voting process.

It should be noted that the foregoing steps 210 to 250 respectively have the same technical features as steps 110 to 150 in the stereo matching method shown in FIG. 1. Therefore, for specific implementations of steps 401 and 402, reference may be made to a corresponding description in steps 110 to 150 in the foregoing embodiment. Details are not described again in this embodiment.

It may be learned from the above technical solutions that, the beneficial effects of the embodiments of the present invention lie in that, after the dense disparity map is obtained, the fringe effect in the dense disparity map is corrected based on the voting in the vertical direction, which can further improve the accuracy of stereo matching.

Embodiment III

Figure 5:
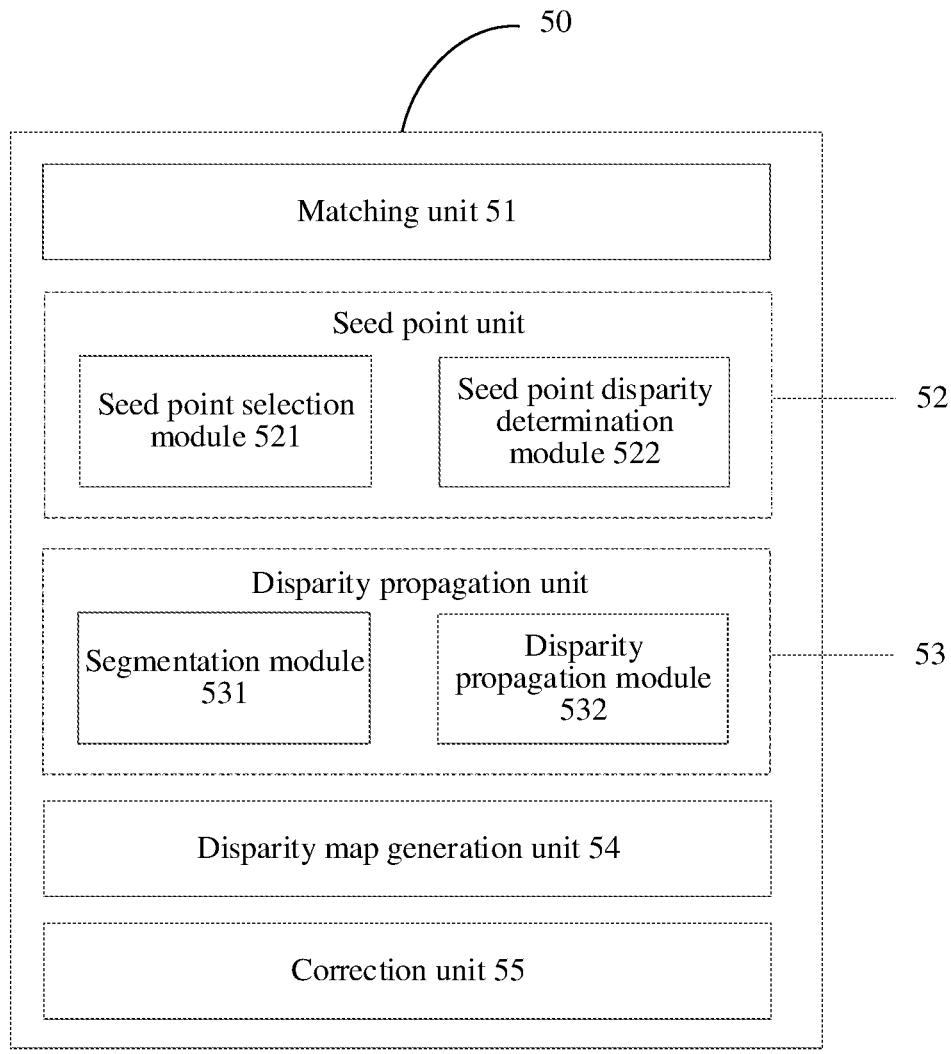
FIG. 5 is a schematic structural diagram of a stereo matching apparatus according to an embodiment of the present invention.

FIG. 5 is a schematic structural diagram of an apparatus for stereo matching according to an embodiment of the present invention. Referring to FIG. 5, the apparatus 50 includes a matching unit 51, a seed point unit 52, a disparity propagation unit 53 and a disparity map generation unit 54.

The matching unit 51 is configured to calculate initial disparity values of pixel points in a left view and a right view by using a local stereo matching algorithm, to obtain an initial left disparity map of the left view and an initial right disparity map of the right view.

The seed point unit 52 includes a seed point selection module 521 and a seed point disparity determination module 522. The seed point selection module 521 is configured to select, from the initial left disparity map or the initial right disparity map, a pixel point that meets a preset condition as a seed point. The preset condition includes: a left-right consistency check is passed. The seed point disparity determination module 522 is configured to use the initial disparity value of the pixel point as a disparity value of the seed point.

The disparity propagation unit 53 includes a segmentation module 531 and a disparity propagation module 532. The segmentation module 531 is configured to, for each non-seed point, construct a confidence propagation region corresponding to the non-seed point in a horizontal direction based on a color difference and a spatial pixel-to-pixel distance. The disparity propagation module 532 is configured to determine a disparity value of the non-seed point based on a disparity value of a left seed point or a right seed point in the confidence propagation region that is immediately adjacent to the non-seed point.

The disparity map generation unit 54 is configured to form a dense disparity map based on disparity values of all seed points and disparity values of all non-seed points.

In this embodiment, the matching unit 51 may be first used to calculate initial disparity values of pixel points in a left view and a right view by using a local stereo matching algorithm, to obtain an initial left disparity map of the left view and an initial right disparity map of the right view. Then the seed point unit 52 selects, from the initial left disparity map or the initial right disparity map, a pixel point that meets a preset condition as a seed point, and uses the initial disparity value of the pixel point as a disparity value of the seed point. Then for each non-seed point, the disparity propagation unit 53 constructs a confidence propagation region corresponding to the non-seed point in a horizontal direction based on a color difference and a spatial pixel-to-pixel distance, and determines a disparity value of the non-seed point based on a disparity value of a left seed point or a right seed point in the confidence propagation region that is immediately adjacent to the non-seed point. Finally, the disparity map generation unit 54 forms a dense disparity map based on disparity values of all seed points and disparity values of all non-seed points.

In some embodiments, the seed point selection module 521 is specifically configured to:

scan line-by-line the initial left disparity map or the initial right disparity map to select the pixel point that meets the preset condition as the seed point. For each scan line, rightward line segmentation is performed starting from a leftmost pixel point of the scan line based on the color difference and the spatial pixel-to-pixel distance, to obtain a plurality of support regions, where each of the support regions is searched starting from the leftmost pixel point for the pixel point that meets the preset condition as the seed point, and when the seed point is found in the support region, a next support region is searched for a next seed point.

In some embodiments, the preset condition further includes: during local stereo matching, a difference between a second smallest cost and the smallest cost corresponding to the pixel point is greater than or equal to a first preset threshold.

In some embodiments, the segmentation module 531 is specifically configured to:

with the non-seed point as a center, detect a left segmentation point and a right segmentation point of the non-seed point respectively in a horizontally leftward direction and a horizontally rightward direction, and use a region between the left segmentation point and the right segmentation point as the confidence propagation region corresponding to the non-seed point, where the left segmentation point and the right segmentation point meet the following condition:

a color difference with the non-seed point is greater than a second preset threshold; or a spatial pixel-to-pixel distance with the non-seed point is greater than a third preset threshold.

In some embodiments, the disparity propagation module 532 is specifically configured to:

if only the left seed point that is immediately adjacent to the non-seed point exists in the confidence propagation region, use the disparity value of the left seed point as the disparity value of the non-seed point;

if only the right seed point that is immediately adjacent to the non-seed point exists in the confidence propagation region, use the disparity value of the right seed point as the disparity value of the non-seed point; or if both the left seed point and the right seed point that are immediately adjacent to the non-seed point exist in the confidence propagation region, determine the disparity value of the non-seed point according to a characteristic of a region in which the non-seed point is located and based on the disparity value of the left seed point and the disparity value of the right seed point.

Further, in some other embodiments, if both the left seed point and the right seed point that are immediately adjacent to the non-seed point exist in the confidence propagation region, the disparity propagation module 532 is specifically configured to:

if the non-seed point is in a blocked region or a depth-discontinuous region, use a smaller one of the disparity value of the left seed point and the disparity value of the right seed point as the disparity value of the non-seed point; or otherwise, use a linearly interpolated value between the disparity value of the left seed point and the disparity value of the right seed point as the disparity value of the non-seed point.

In addition, in some embodiments, the apparatus 50 further includes a correction unit 55. The correction unit 55 is configured to correct a fringe effect in the dense disparity map based on the voting in the vertical direction.

In some other embodiments, the correction unit 55 is further configured to update, the disparity value of each pixel point by bilateral filtering in four adjacent regions of the pixel point.

It should be noted that, Since the apparatus for stereo matching and the method for stereo matching in the foregoing method embodiment are based on the same inventive concept, the corresponding content of the foregoing method embodiment is also applicable to the apparatus embodiment, and the details are not described herein again.

It may be learned from the above technical solutions that, the beneficial effects of the embodiments of the present invention lie in that, in the apparatus for stereo matching provided in the embodiment of the present invention, the matching unit 51 is first used to calculate initial disparity values of pixel points in a left view and a right view by using a local stereo matching algorithm, to obtain an initial left disparity map of the left view and an initial right disparity map of the right view. Then the seed point unit 52 selects, from the initial left disparity map or the initial right disparity map, a pixel point that meets a preset condition as a seed point, and uses the initial disparity value of the pixel point as a disparity value of the seed point. Then for each non-seed point, the disparity propagation unit 53 constructs a confidence propagation region corresponding to the non-seed point in a horizontal direction based on a color difference and a spatial pixel-to-pixel distance, and determines a disparity value of the non-seed point based on a disparity value of a left seed point or a right seed point in the confidence propagation region that is immediately adjacent to the non-seed point. Finally, the disparity map generation unit 54 forms a dense disparity map based on disparity values of all seed points and disparity values of all non-seed points. The dense disparity map with a higher accuracy can be formed quickly, so as to achieve an improvement in both a speed and an accuracy of stereo matching.

It should be noted that the foregoing described apparatus embodiments are merely examples. The units described as separate parts may or may not be physically separated and may be located in one position, or may be distributed on a plurality of network units. Some or all of the modules may be selected according to actual needs to implement the objectives of the solutions of the embodiments.

Embodiment IV

Figure 6:
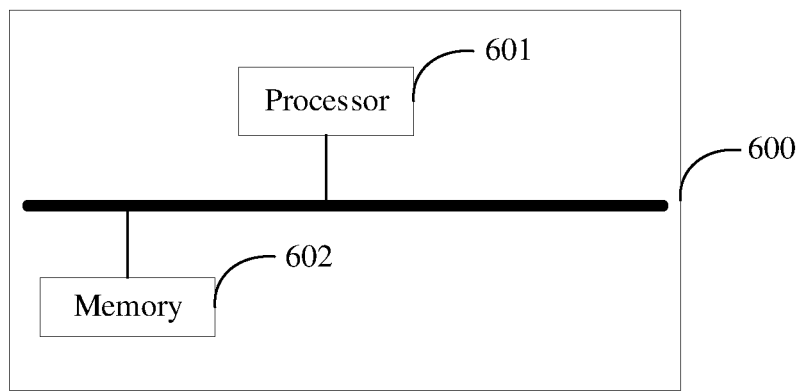
FIG. 6 is a schematic diagram of a hardware structure of an electronic device according to an embodiment of the present invention.

FIG. 6 is a schematic diagram of a hardware structure of an electronic device according to an embodiment of the present invention. The electronic device 600 may be any type of hardware device, for example, a UAV, an automotive MCU, a smart phone, a robot, a personal computer, a wearable smart device or the like, capable of performing the method for stereo matching provided in the foregoing method embodiment or running the apparatus for stereo matching provided in the foregoing apparatus embodiment.

Specifically, referring to FIG. 6, the electronic device 600 includes:

one or more processors 601 and a memory 602. One processor 601 is used as an example in FIG. 6.

The processor 601 and the memory 602 may be connected by using a bus or in another manner. A connection by using the bus is used as an example in FIG. 6.

As a non-transitory computer-readable storage medium, the memory 602 may be configured to store a non-transitory software program, a non-transitory computer executable program and a module, for example, a program instruction/module (for example, the matching unit 51, the seed point unit 52, the disparity propagation unit 53, the disparity map generation unit 54 and the correction unit 55 shown in FIG. 5) corresponding to the method for stereo matching in the embodiments of the present invention. The processor 601 executes various functional applications and data processing of the apparatus 50 for stereo matching by running the non-transitory software program, an instruction and the module stored in the memory 602, that is, the implements the method for stereo matching in any of the foregoing method embodiments.

The memory 602 may include a program storage area and a data storage area. The program storage area may store an operating system and an application program required by at least one function. The data storage area may store data created according to use of the stereo matching apparatus 50, and the like. In addition, the memory 602 may include a high-speed random access memory, and may further include a non-transitory memory, such as at least one magnetic disk memory device, a flash memory device, or other non-transitory solid-state memory devices. In some embodiments, the memory 602 optionally includes memories remotely disposed relative to the processor 601, and these remote memories may be connected to the processor 601 by using a network. Examples of the network include, but are not limited to, the Internet, an intranet, a local area network, a mobile communication network, and a combination thereof.

The one or more modules are stored in the memory 602. When executed by the one or more processors 601, the method for stereo matching in any of the above method embodiments is performed. For example, the above method steps 110-150 in FIG. 1 and method steps 210-260 in FIG. 4 are performed to implement functions of the units 51-55 in FIG. 5.

Embodiment V

An embodiment of the present invention further provides a non-transitory computer-readable storage medium, storing computer-executable instructions that are executed by one or more processors, for example, executed by the processor 601 in FIG. 6, so that the one or more processors may perform the method for stereo matching in any of the foregoing method embodiments, for example, perform method steps 110-150 in FIG. 1 and method steps 210-260 in FIG. 4 to implement functions of the units 51-55 in FIG. 5.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by an electronic device, the electronic device may be enabled to execute the procedures of the foregoing method embodiments. The storage medium may be a magnetic disk, an optical disc, a read-only memory (ROM), a RAM or the like.

The above products (including: the electronic device, the non-transitory computer-readable storage media and computer program products) may perform the method for stereo matching provided in the embodiments of the present invention and has the corresponding functional modules for performing the method for stereo matching and beneficial effects. For technical details not described in detail in this embodiment, reference may be made to the stereo matching method provided in the embodiments of the present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for stereo matching, the method comprising:
   calculating initial disparity values of pixel points in a left view and a right view by using a local stereo matching algorithm, to obtain an initial left disparity map of the left view and an initial right disparity map of the right view;
   selecting, from the initial left disparity map or the initial right disparity map, a pixel point that meets a preset condition as a seed point, and using the initial disparity value of the pixel point as a disparity value of the seed point, wherein the preset condition comprises: a left-right consistency check is passed;
   for each non-seed point, constructing a confidence propagation region corresponding to the non-seed point in a horizontal direction based on a color difference and a spatial pixel-to-pixel distance;
   determining a disparity value of the non-seed point based on a disparity value of a left seed point or a right seed point in the confidence propagation region that is immediately adjacent to the non-seed point; and
   forming a dense disparity map based on disparity values of all seed points and disparity values of all non-seed points;
   wherein the preset condition further comprises:
   during local stereo matching, a difference between a second smallest cost and a smallest cost corresponding to the pixel point is greater than or equal to a first preset threshold.

2. The method according to claim 1, wherein the selecting, from the initial left disparity map or the initial right disparity map, a pixel point that meets a preset condition as a seed point comprises:
   scanning line-by-line the initial left disparity map or the initial right disparity map to select the pixel point that meets the preset condition as the seed point, wherein for each scan line, rightward line segmentation is performed starting from a leftmost pixel point of the scan line based on the color difference and the spatial pixel-to-pixel distance, to obtain a plurality of support regions, wherein each of the support regions is searched starting from the leftmost pixel point for the pixel point that meets the preset condition as the seed point, and when the seed point is found in the support region, a next support region is searched for a next seed point.

3. The method according to claim 1, wherein the constructing a confidence propagation region corresponding to the non-seed point in a horizontal direction based on a color difference and a spatial pixel-to-pixel distance comprises:
   with the non-seed point as a center, detecting a left segmentation point and a right segmentation point of the non-seed point respectively in a horizontally leftward direction and a horizontally rightward direction, and using a region between the left segmentation point and the right segmentation point as the confidence propagation region corresponding to the non-seed point, wherein the left segmentation point and the right segmentation point meet the following condition:

a color difference with the non-seed point is greater than a second preset threshold; or a spatial pixel-to-pixel distance with the non-seed point is greater than a third preset threshold.

4. The method according to claim 1, wherein the determining a disparity value of the non-seed point based on a disparity value of a left seed point or a right seed point in the confidence propagation region that is immediately adjacent to the non-seed point comprises:

when only the left seed point that is immediately adjacent to the non-seed point exists in the confidence propagation region, using the disparity value of the left seed point as the disparity value of the non-seed point;

when only the right seed point that is immediately adjacent to the non-seed point exists in the confidence propagation region, using the disparity value of the right seed point as the disparity value of the non-seed point; or when both the left seed point and the right seed point that are immediately adjacent to the non-seed point exist in the confidence propagation region, determining the disparity value of the non-seed point according to a characteristic of a region in which the non-seed point is located and based on the disparity value of the left seed point and the disparity value of the right seed point.

5. The method according to claim 4, wherein the determining the disparity value of the non-seed point according to a characteristic of a region in which the non-seed point is located and based on the disparity value of the left seed point and the disparity value of the right seed point comprises:

when the non-seed point is in a blocked region or a depth-discontinuous region, using a smaller one of the disparity value of the left seed point and the disparity value of the right seed point as the disparity value of the non-seed point; or otherwise, using a linearly interpolated value between the disparity value of the left seed point and the disparity value of the right seed point as the disparity value of the non-seed point.

6. The method according to claim 1, wherein after the step of forming the dense disparity map based on the disparity values of all seed points and the disparity values of all non-seed points, the method further comprises:

correcting a fringe effect in the dense disparity map based on voting in a vertical direction.

7. The method according to claim 6, wherein after the step of correcting the fringe effect in the dense disparity map based on the voting in the vertical direction, the method further comprises:

updating the disparity value of each pixel point by bilateral filtering in four adjacent regions of the pixel point.

8. An apparatus for stereo matching, the apparatus comprising:

a processor, configured to: calculate initial disparity values of pixel points in a left view and a right view by using a local stereo matching algorithm, to obtain an initial left disparity map of the left view and an initial right disparity map of the right view;

select, from the initial left disparity map or the initial right disparity map, a pixel point that meets a preset condition as a seed point, wherein the preset condition comprises: a left-right consistency check is passed;

use the initial disparity value of the pixel point as a disparity value of the seed point;

for each non-seed point, constructing a confidence propagation region corresponding to the non-seed point in a horizontal direction based on a color difference and a spatial pixel-to-pixel distance;

determine a disparity value of the non-seed point based on a disparity value of a left seed point or a right seed point in the confidence propagation region that is immediately adjacent to the non-seed point; and form a dense disparity map based on disparity values of all seed points and disparity values of all non-seed points;

wherein the preset condition further comprises:

during local stereo matching, a difference between a second smallest cost and a smallest cost corresponding to the pixel point is greater than or equal to a first preset threshold.

9. The apparatus according to claim 8, wherein the processor is specifically configured to:

scan line-by-line the initial left disparity map or the initial right disparity map to select the pixel point that meets the preset condition as the seed point, wherein for each scan line, rightward line segmentation is performed starting from a leftmost pixel point of the scan line based on the color difference and the spatial pixel-to-pixel distance, to obtain a plurality of support regions, wherein each of the support regions is searched starting from the leftmost pixel point for the pixel point that meets the preset condition as the seed point, and when the seed point is found in the support region, a next support region is searched for a next seed point.

10. The apparatus according to claim 8, wherein the processor is specifically configured to:

with the non-seed point as a center, detecting a left segmentation point and a right segmentation point of the non-seed point respectively in a horizontally leftward direction and a horizontally rightward direction, and using a region between the left segmentation point and the right segmentation point as the confidence propagation region corresponding to the non-seed point, wherein the left segmentation point and the right segmentation point meet the following condition:

a color difference with the non-seed point is greater than a second preset threshold; or a spatial pixel-to-pixel distance with the non-seed point is greater than a third preset threshold.

11. The apparatus according to claim 8, wherein the processor is specifically configured to:

when only the left seed point that is immediately adjacent to the non-seed point exists in the confidence propagation region, use the disparity value of the left seed point as the disparity value of the non-seed point;

when only the right seed point that is immediately adjacent to the non-seed point exists in the confidence propagation region, use the disparity value of the right seed point as the disparity value of the non-seed point; or when both the left seed point and the right seed point that are immediately adjacent to the non-seed point exist in the confidence propagation region, determine the disparity value of the non-seed point according to a characteristic of a region in which the non-seed point is located and based on the disparity value of the left seed point and the disparity value of the right seed point.

12. The apparatus according to claim 11, wherein if both the left seed point and the right seed point that are immediately adjacent to the non-seed point exist in the confidence propagation region, the processor is specifically configured to:
  when the non-seed point is in a blocked region or a depth-discontinuous region, use a smaller one of the disparity value of the left seed point and the disparity value of the right seed point as the disparity value of the non-seed point; or
  otherwise, use a linearly interpolated value between the disparity value of the left seed point and the disparity value of the right seed point as the disparity value of the non-seed point.

13. The apparatus according to claim 8, wherein the processor is further configured to correct a fringe effect in the dense disparity map based on voting in a vertical direction.

14. The apparatus according to claim 13, wherein the processor is further configured to:
  update the disparity value of each pixel point by bilateral filtering in four adjacent regions of the pixel point.

15. An electronic device, comprising:
  at least one processor; and
  a memory communicatively connected to the at least one processor, wherein the memory stores instructions executable by the at least one processor, the instructions, when executed by the at least one processor, causing the at least one processor to:
  calculate initial disparity values of pixel points in a left view and a right view by using a local stereo matching algorithm, to obtain an initial left disparity map of the left view and an initial right disparity map of the right view;
  select, from the initial left disparity map or the initial right disparity map, a pixel point that meets a preset condition as a seed point, and use the initial disparity value of the pixel point as a disparity value of the seed point, wherein the preset condition comprises:
  a left-right consistency check is passed;
  for each non-seed point, construct a confidence propagation region corresponding to the non-seed point in a horizontal direction based on a color difference and a spatial pixel-to-pixel distance;
  determine a disparity value of the non-seed point based on a disparity value of a left seed point or a right seed point in the confidence propagation region that is immediately adjacent to the non-seed point; and
  form a dense disparity map based on disparity values of all seed points and disparity values of all non-seed points;
  wherein the preset condition further comprises:
  during local stereo matching, a difference between a second smallest cost and a smallest cost corresponding to the pixel point is greater than or equal to a first preset threshold.

16. A non-transitory computer-readable storage medium, storing computer-executable instructions used for causing an electronic device to:
  calculate initial disparity values of pixel points in a left view and a right view by using a local stereo matching algorithm, to obtain an initial left disparity map of the left view and an initial right disparity map of the right view;
  select, from the initial left disparity map or the initial right disparity map, a pixel point that meets a preset condition as a seed point, and use the initial disparity value of the pixel point as a disparity value of the seed point, wherein the preset condition comprises:
  a left-right consistency check is passed;
  for each non-seed point, construct a confidence propagation region corresponding to the non-seed point in a horizontal direction based on a color difference and a spatial pixel-to-pixel distance;
  determine a disparity value of the non-seed point based on a disparity value of a left seed point or a right seed point in the confidence propagation region that is immediately adjacent to the non-seed point; and
  form a dense disparity map based on disparity values of all seed points and disparity values of all non-seed points;
  wherein the preset condition further comprises:
  during local stereo matching, a difference between a second smallest cost and a smallest cost corresponding to the pixel point is greater than or equal to a first preset threshold.

* * * * *